Figure 1:
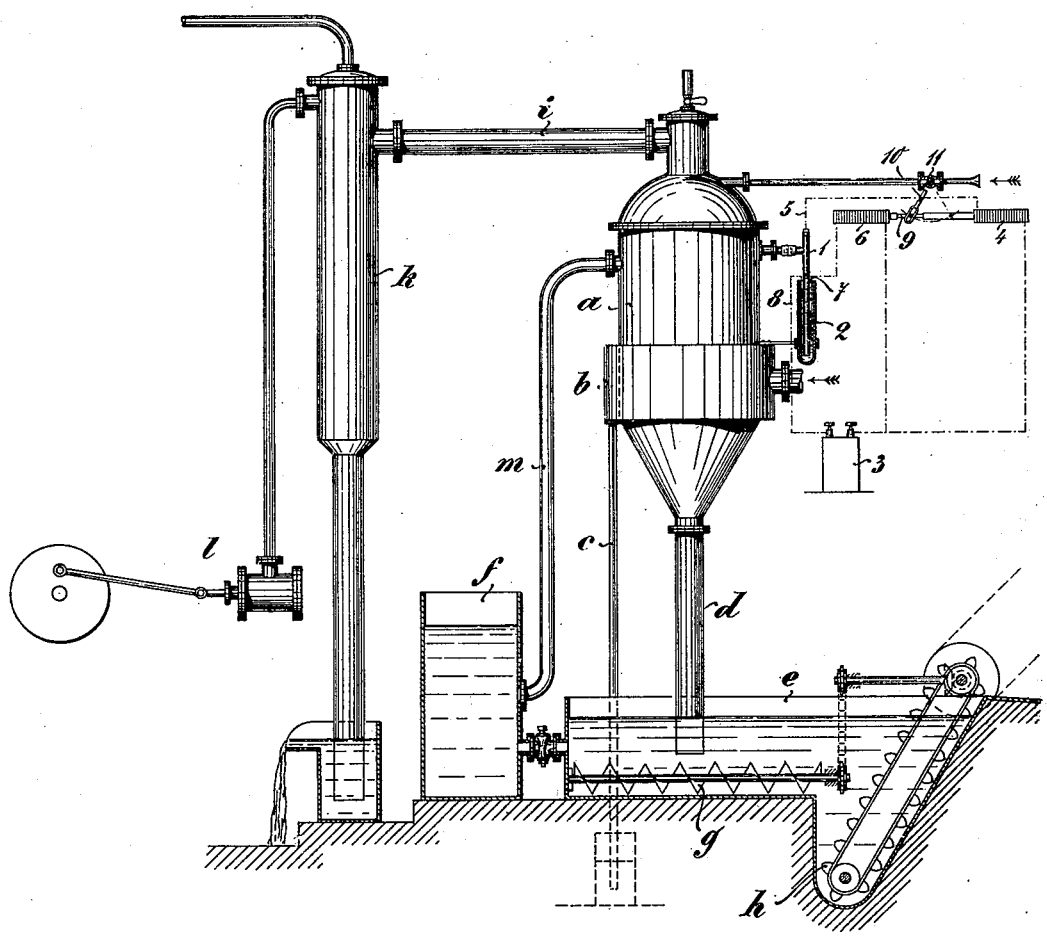

No. 700,860. Patented May 27, 1902.
G. N. VIS.
VACUUM APPARATUS FOR BOILING BRINE.
(Application filed July 13, 1900.)
(No Model.) 2 Sheets—Sheet 1.

Witnesses:
Inventor:
Gerhard N. Vis

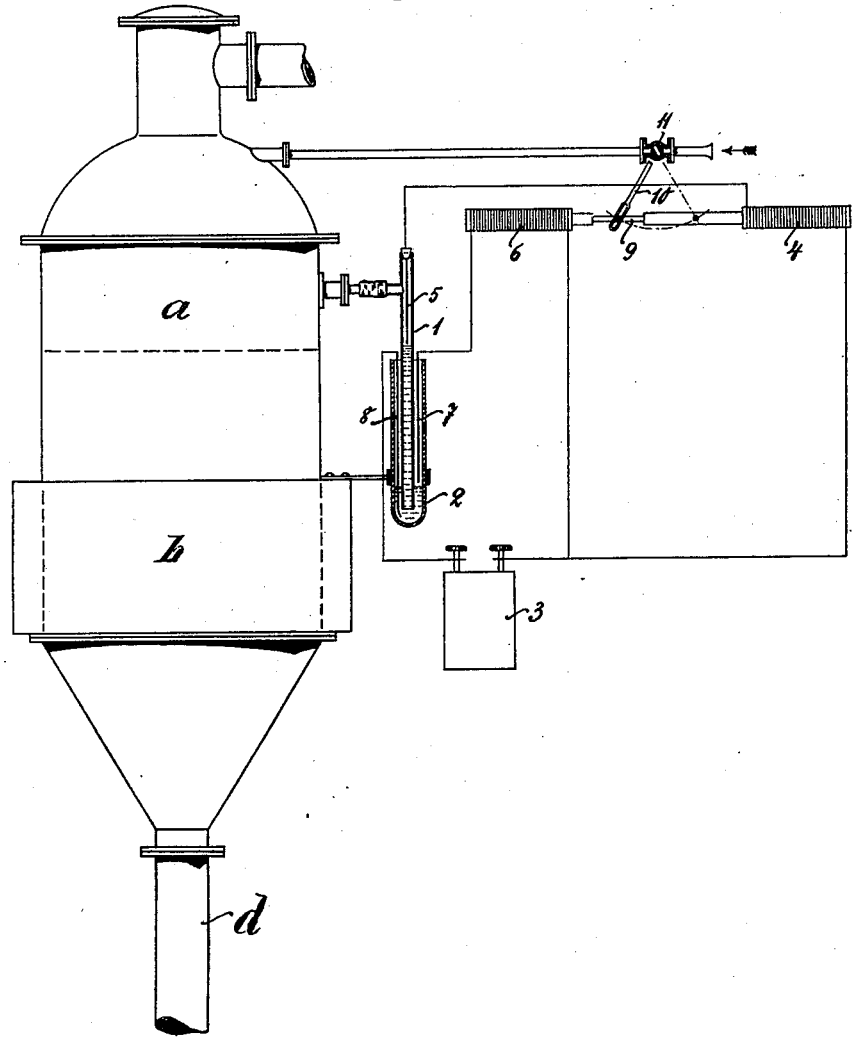

UNITED STATES PATENT OFFICE.

GERHARD NICOLAAS VIS, OF SCHWEIZERHALLE, SWITZERLAND.

VACUUM APPARATUS FOR BOILING BRINE.

SPECIFICATION forming part of Letters Patent No. 700,860, dated May 27, 1902.

Application filed July 13, 1900. Serial No. 23,493. (No model.)

*To all whom it may concern:*

Be it known that I, GERHARD NICOLAAS VIS, doctor of philosophy and chemist, a subject of the Queen of the Netherlands, residing at Schweizerhalle, near Basle, Switzerland, have invented a new and useful Vacuum Apparatus for Boiling Brine, of which the following is a specification.

This invention relates to vacuum apparatus for boiling brine, the pan or pans of which communicate at the lower end with a brine vessel, which is open to the atmosphere, and are provided with means for periodically reducing the vacuum in order to discharge the salt separated out in the pan or pans from the latter into the said vessel. In a prior organization of such apparatus shown and described in my application Serial No. 23,494, filed of even date herewith, the said means for periodically reducing the vacuum consist in a pipe which descends from the top of the pan into an open vessel containing a non-incrusting liquid and forming a liquid seal for the open lower end of said pipe, so that by periodically causing a higher degree of vacuum to take place liquid is caused to ascend into said pipe until the latter becomes unsealed, when atmospheric air rushes through the pipe into the pan and by reducing and destroying the vacuum causes the brine in the pan to rush back, whereby the salt accumulated in the bottom part of the pan is discharged into the vessel below. This operation needs to take place at intervals of about ten minutes and to be so regulated that the level of the brine is caused to sink about twenty centimeters. I have found that in this manner it is difficult to obtain such a sudden shock-like downward rush of the brine as is necessary for carrying the greater part of the salt from the pan into the vessel below.

According to the present invention I use an air-cock in combination with electric means for opening and closing the same, said electric means being under the control of a manometer connected with the pan, so that upon an alternation of the normal vacuum in the pan, brought about by causing the pump to work faster, the air-cock is caused to open, while the resulting decrease of the vacuum causes the cock to close.

The improved apparatus is illustrated on the annexed sheet of drawings, of which—

Figure 1 is an elevation, partly in section, of a complete apparatus, showing the preferred form of the electrical arrangement; and Fig. 2 an elevation, drawn to a larger scale, of the pan and its electrically-controlled air-cock.

In both figures the electrical arrangement for periodically opening and closing the air-cock is shown in a diagrammatical manner for clearness sake.

$a$ is the pan, $b$ the cylindrical casing inclosing its heating-pipes and provided with a descending pipe $c$ for the eduction of the water forming in the heating-pipes, and $d$ the tubular extension through which the pan communicates with the open vessel $e$, which is fed with brine from a main reservoir $f$ and in the bottom part of which is provided a conveyer $g$ for delivering the salt to another conveyer $h$ for transporting the salt to a drying plant. (Not shown.) At the top the pan is connected through a pipe $i$ with a condenser $k$, preferably of the well-known cataract type, which is connected with the air-pump $l$. $m$ is a pipe connecting the upper part of the pan with the main reservoir $f$ for periodically filling the pan with brine from above the heating-pipes in order to remove the crusts formed thereon. The vacuum-space of the pan is in communication with a quicksilver manometer composed of a tube 1, dipping with its lower open end into a quicksilver vessel 2, which is open to the atmosphere. One pole of an electric battery 3 is in connection on one hand through a solenoid-coil 4 with a wire 5, passing down into the tube 1 to a little above the normal height of the quicksilver, (see Fig. 2,) while it is connected on the other hand through a second solenoid-coil 6 to a wire 7, passing down into the open quicksilver vessel 2 to a little above the normal height of the quicksilver. The other pole of the battery is connected to a wire 8, dipping into the quicksilver vessel 2 near the bottom. The two solenoids 4 and 6 are provided with a common core 9, to which is linked the lever-handle 10 of the air-cock 11 by means of a slot and a pin.

With a normal vacuum in the pan the quicksilver in the manometer does not touch the wires 5 and 7. The core 9 is in the left-hand end position, into which the solenoid 6 has drawn it, and with this position of the core the air-cock 11 is closed. Now if the vacuum in the pan is increased the quicksilver rises in the tube 1 and by touching the wire 5 closes the circuit of the battery 3 through the solenoid 4—namely, from 3 through 4, 5, quicksilver, and 8 back to battery 3. The solenoid 4 pulls by its attraction the core 9 to the right, and thereby opens the air-cock 11. As a consequence the vacuum in the pan is reduced and so beyond the normal amount whereby the quicksilver in the tube 1 is caused to sink down into the vessel 2, so that the wire 5 is uncovered, wire 7, on the contrary, brought in contact with the quicksilver, and while thus the circuit through the solenoid 4 is reopened the circuit through the solenoid 6 is closed, so that at present the electric current passes from 3 through 6, 7, quicksilver, and back to 3. The solenoid 6 now shifts the core 9 by its attraction to the left, so that the air-cock 11 is reclosed. The vacuum in the pan increases again to the normal amount, so that by the quicksilver rising in tube 1 wire 7 is uncovered—that is to say, the circuit through solenoid 6 broken, the wire 5, however, not yet being re-covered. The air-cock consequently remains closed until the vacuum is anew caused to increase. At each opening of the air-cock 11 the brine in the pan rushes suddenly back, whereby the greater part of the salt separated out, which had accumulated in the bottom part of the pan, is discharged from the latter through its leg $d$ into the reservoir $e$ below. Obviously the said solenoids may be replaced by electromagnets, as will be readily understood by those skilled in the art.

What I claim as my invention is—

1. In apparatus for boiling brine the combination with a pan provided at its lower end with a tubular extension, a brine vessel open to the atmosphere and arranged below said extension to receive the same, means for heating the pan and means for creating a vacuum in the pan, of an air-cock connected with the vacuum-space of the pan, a manometer in communication with said space, two normally open circuits for operating said cock, a pair of contacts under the control of said manometer for completing one circuit when the vacuum in the pan is caused to rise above the normal degree, another pair of contacts under the control of said manometer for closing the other circuit when the vacuum in the pan is caused to fall below the normal degree, and a source of electricity connected with said circuits, substantially as and for the purpose described.

2. In apparatus for boiling brine the combination with a brine vessel open to the atmosphere, a pan provided at its lower end with a tubular extension located in said vessel, means for heating the pan and means for creating a vacuum in the latter, of an air-cock communicating with the top part of the pan, a solenoid for opening and a solenoid for closing said cock, a source of electricity, connections between said solenoids and source of electricity, a movable contact placed in said connections and constituted by the quicksilver of a manometer communicating with the pan, and stationary contacts arranged in said connections for coöperation with said movable contact to alternately close the circuits of said solenoids, substantially as and for the purpose described.

3. In apparatus for boiling brine the combination with a brine vessel open to the atmosphere, a pan provided at its lower end with a tubular extension located in said vessel, means for heating the pan and means for creating a vacuum in the latter, of an air-cock communicating with the top part of the pan, a solenoid for opening and a solenoid for closing said air-cock, a source of electricity connected at one pole to both of the said solenoids, a tube communicating with the vacuum-space of the pan, a vessel containing quicksilver and arranged to receive the lower end of said tube, an electric contact arranged in said tube and connected with one of the solenoids, another electric contact arranged in said vessel and connected with the other solenoid, and a third electric contact so arranged as to permanently dip into the quicksilver of said vessel and connected with the other pole of said source of electricity, substantially as and for the purpose described.

In testimony whereof I have hereunto set my hand in presence of two subscribing witnesses.

GERHARD NICOLAAS VIS.

Witnesses:
GEORGE GIFFORD,
ALBERT GRAETER.